United States Patent [19]

Gough

[11] Patent Number: 4,846,363

[45] Date of Patent: Jul. 11, 1989

[54] DUAL GAS PRESSURE VESSEL

[75] Inventor: Richard J. Gough, Somerset, England

[73] Assignee: Baj Limited, England

[21] Appl. No.: 99,553

[22] Filed: Sep. 22, 1987

[30] Foreign Application Priority Data

Sep. 22, 1986 [GB] United Kingdom ................ 8622735

[51] Int. Cl.4 ........................................ F16K 17/40

[52] U.S. Cl. ........................................ 220/3; 220/89 A; 137/68.1

[58] Field of Search .............. 220/3, 22.1, 85 A, 85 B, 220/89 A; 137/68.1

[56] References Cited

U.S. PATENT DOCUMENTS

| | | | |
|---|---|---|---|
| 2,410,310 | 10/1946 | Smith | 220/89 A |
| 2,515,068 | 7/1950 | Young | 137/68.1 X |
| 4,342,988 | 8/1982 | Thompson et al. | 220/89 A X |
| 4,463,865 | 8/1984 | Mundt et al. | 137/68.1 X |
| 4,657,157 | 4/1987 | Short, III | 220/89 A |

*Primary Examiner*—Steven M. Pollard

*Attorney, Agent, or Firm*—Wallenstein Wagner & Hattis, Ltd.

[57] ABSTRACT

A dual gas pressure vessel is divided into a first chamber 22 and a second chamber 24 by collapsible bellows 16. As the gas in the first chamber is dishcarged through an exhaust 29 the bellows collapse until a plate 20 is pierced by a probe 32, following which the gas in the second chamber 24 is vented. A support 26 for the plate 20 ensures that, during charging of the vessel, the first and second chambers are well defined in volume.

6 Claims, 2 Drawing Sheets

DUAL GAS PRESSURE VESSEL

DESCRIPTION

1. Technical Field

The present invention relates to dual gas pressure vessels, and particularly to a vessel arranged to supply a controlled amount of a first gas followed by a controlled amount of a second gas.

2. Background Art

In the operation of Joule-Thompson minicoolers it has been found desirable to use two different gases in sequence, the first gas being used to enable a low temperature to be obtained quickly, and the second gas being used to maintain that temperature during the operating period. One way of providing two gases in sequence is to use a separate gas bottle for each, in combination with a suitably controlled system of valves. However, this is expensive and complicated, and the resulting system also tends to be heavy, something which is very undesirable in many situations.

It is an object of the present invention at least to alleviate these problems. It is a further object of the present invention to provide a light-weight, relatively simple pressure vessel which will automatically discharge a controlled amount of a first gas followed by a controlled amount of a second gas.

SUMMARY OF THE INVENTION

According to the present invention, these objects are achieved by a dual gas pressure vessel comprises a first chamber having an exhaust therein, and a second chamber separated from the first by movable dividing means; and connecting means, arranged for operation by virtue of movement of the dividing means as gas is expelled from the first chamber, and arranged to connect the exhaust to the second chamber after a predetermined amount of gas has been expelled from the first chamber. Use of the invention therefore means that only one initiator is required for minicooler operation, the two gases being automatically released in the correct sequence and in the correct quantities. Weight is saved, since only one pressure vessel is required, the two gases preferably being separated by a relatively light dividing means within the pressure vessel.

In one convenient arrangement, the dividing means comprises a concertina-like (or bellows), structure arranged either to expand or to collapse as gas is expelled from the first chamber. Preferably, the concertina-like structure forms an open tube, fixedly attached at one end to the vessel, and closed at the other end by a substantially rigid plate, the tube being arranged to expand or collapse substantially parallel to its axis. In one particular form, the plate is arranged to rest, in its initial position, against a fixed support. This enables the volumes of the two chambers to be well defined, and it also provides a structure which is rigid enough, in combination with its support, to withstand differential pressures during charging of the vessel. Advantageously, the bellows are metallic; this avoids the potential problem of the diffusion of gases through the dividing means over a long period of time.

These and other objects and advantages of the invention will be more readily understood and appreciated by reference to the detailed description of the preferred embodiments and the drawings.

DETAILED DESCRIPTION

Figure 1:
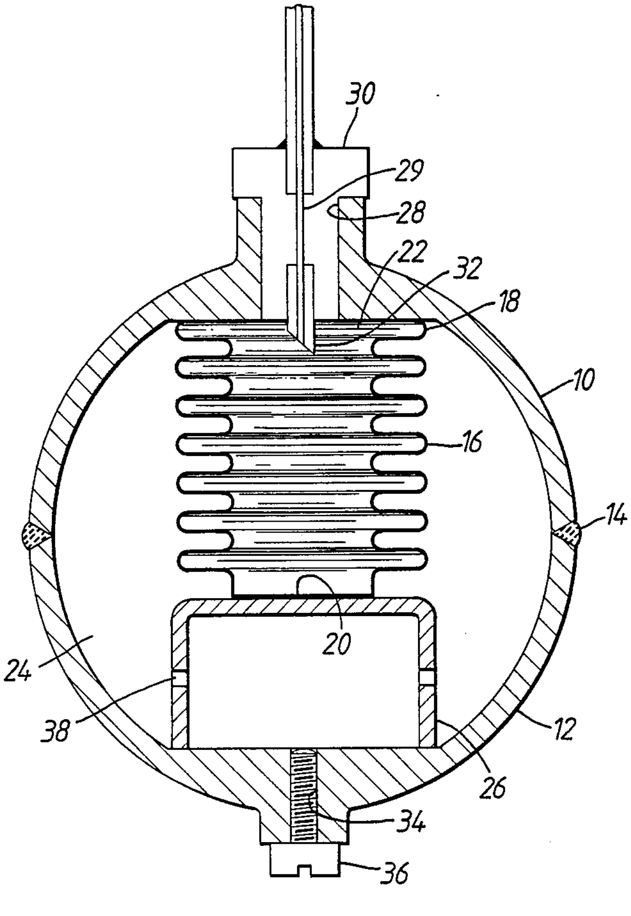
FIG. 1 is a section through the first gas vessel of the invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

The dual gas pressure vessel shown in FIG. 1 comprises a generally hemispherical upper housing portion 10, and a generally hemispherical lower housing portion 12, the upper and lower portions being joined along their common circumference by welding 14. Within the vessel there is a generally cylindrical or tube-like corrugated metallic bellows 16, the upper end 18 of which is fixedly attached to the upper housing portion 10. The other end of the bellows tube is closed by a circular substantially rigid plate 20. Accordingly, the bellows 16 divides the interior of the vessel into a first chamber 22 and a second chamber 24. To prevent diffusion of gases from one chamber to the other through the bellows, the bellows are constructed of an impermeable material, for example metal.

In the position shown in FIG. 1, the plate 20 rests upon the upper surface of an inverted generally cup shaped support member 26 fixedly attached to the lower housing portion 12. The support ensures that the volumes of the first and second chambers 22,24 are well defined; in addition, it imparts rigidity to the bellows 16 during charging of the device (as will be explained below).

An aperture 28 is provided centrally of the upper housing portion, and opening into the first chamber 22. Received within the aperture 28 is a plug 30, and passing through the plug is an exhaust 29. The interior end of the exhaust is contained within a sharp edged probe 32, mounted in the plug 30, and extending into the first chamber 22.

A charging aperture 34, closed by a second plug 36, is provided centrally of the lower housing portion 12, and opens into the interior volume of the support member 26. This is contiguous with the second chamber 24 by virtue of a plurality of holes 38 in the support member 26.

The device is charged by passing a first gas (due to be released first) through the aperture 28 into the first chamber 22 and, at the same time, passing a second gas through the aperture 34 into the second chamber 24. The pressure of the first gas is maintained very slightly higher than that of the second gas, during charging, to ensure that the plate 20 rests upon its support 26, thus controlling the volumes to be allocated to each gas. The nature of the two gases will naturally vary according to their ultimate desired use, but where it is intended to use the dual gas pressure vessel to provide cooling of a Joule-Thompson minicooler the first gas may conveniently be Freon 14 or methane, and the second gas argon or nitrogen. The charging pressure, in this example, is of the order of 6000 psi.

The operation of the device will now be described. When the exhaust 29 is vented, the first gas passes out from the first chamber 22 reducing the pressure within the bellows 16. As the pressure falls the bellows 16 will gradually collapse and the plate 20 will move from its seat on the support 26. The continued pressure of the gas in the second chamber 24 forces the bellows to contract until the plate 20 is pierced by the probe 32. The second gas is then expelled from the exhaust 29.

In a typical example, the first gas is expelled in about half a second, and is used to quickly provide low temperature in a Joule-Thompson minicooler; the second gas is expelled over a period of about 20 to 30 seconds, and is used to maintain the low temperature of the minicooler during its operating period.

Figure 2:
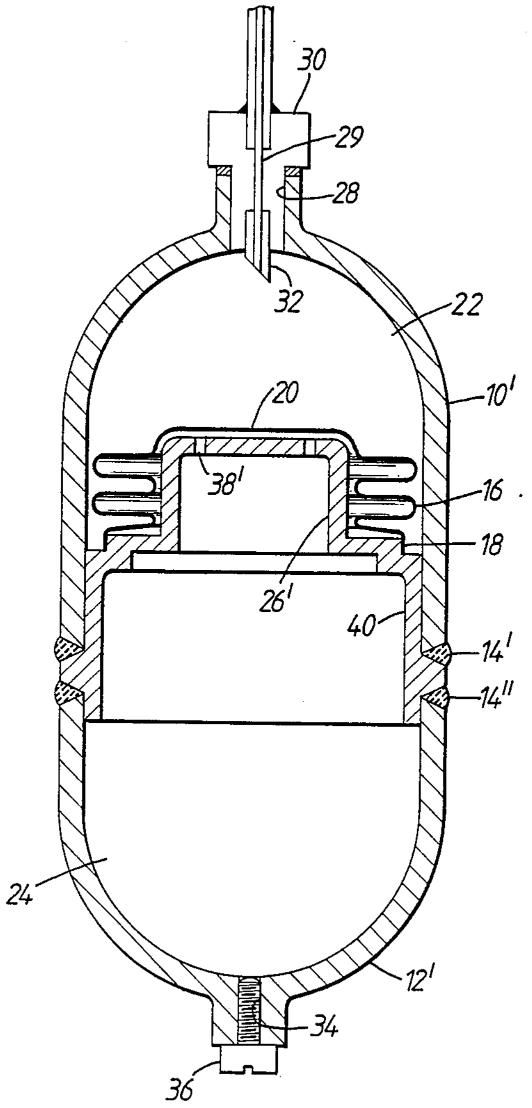
FIG. 2 is a section through the second gas vessel of the invention.

A second embodiment of the device is shown in FIG. 2 in which like parts will be designated with like numerals. This embodiment differs from the embodiment of FIG. 1 in that the bellows 16 are collapsed when the vessel is fully charged, and expand as the gas in the first chamber is expelled. In this embodiment, as will be seen from the Figure, there is provided between the upper housing portion 10' and the lower housing portion 12' an intermediate bellows support member 40. The bellows support member is welded at 14, and 14'' to the portions 10',12' respectively. Here, the inverted cup shaped support member 26, on which the plate 20 rests, comprises the central portion of the intermediate bellows support member 40. The lower end of the bellows 16 is attached to the bellows support member 40 around the circumference of the support member 26', so that the bellows sit, in their collapsed form, around the outer peripheral surface of the support member 26'. A plurality of holes 38', is provided in the upper surface of the support member 26' so that pressure in the second chamber 24 acts upon the lower surface of the plate 20.

In use, as the first gas is expelled from the first chamber 22, the pressure of the remaining gas in the second chamber 24 acts upon the plate 20 to expand the bellows 16. Eventually, the plate 20 is pierced by the probe 32 and the venting of the second gas follows.

In a number of other embodiments (not shown) the bellows may be replaced with any other sort of flexible expandable tubing, the only limitation being that the walls should be sufficiently rigid against pressure perpendicular to the tube axis to prevent the tube from collapsing substantially radially rather than substantially longitudinally.

In a further possible embodiment (not shown) the upper and lower housing portions 10,12 or 10',12' may be screwed rather than welded together, sealing being provided by one or more O-rings.

It will be readily understood that various alterations and changes can be made to the above described preferred embodiments of the invention without departing from the scope and spirit of the invention.

I claim:

1. A dual gas pressure vessel for sequentially dispensing two separate pressurized fluids through a common passage comprising first and second housing portions joined to define an enclosure with a movable bellows connected to one of said housing portions and dividing said enclosure into first and second chambers, one of said housing portions having an exhaust passage in communication with said first chamber with piercing means adjacent said exhaust passage, said bellow having a plate that is moved toward said exhaust passage in response to dispensing a first pressurized fluid from said first chamber, said plate being pierced by said piercing means to place said second chamber in communication with said exhaust passage for dispensing a second pressurized fluid from said second chamber through said exhaust chamber.

2. A dual gas pressure vessel as defined in claim 1, wherein said bellows is corrugated and collapses as said first pressurized fluid is dispensed from said first chamber.

3. A dual gas pressure vessel as defined in claim 1, wherein said bellows is corrugated and expands as said first pressurized fluid is dispensed from said first chamber.

4. A dual gas pressure vessel as defined in claim 1, further including support means in said vessel for supporting said plate in its position.

5. A dual gas pressure vessel as defined in claim 1, in which said bellows forms an open tube closed at one end by said plate and arranged to expand and collapse substantially parallel to its axis.

6. A dual gas pressure vessel as defined in claim 1, further including bellows support means between said housing portions with said bellows collapsed on said support means when said chambers are filled with pressurized fluids.

* * * * *